L. ALEXANDER & R. H. LEMMON.
WAGON BRAKE.
APPLICATION FILED NOV. 17, 1910.
998,825.
Patented July 25, 1911.
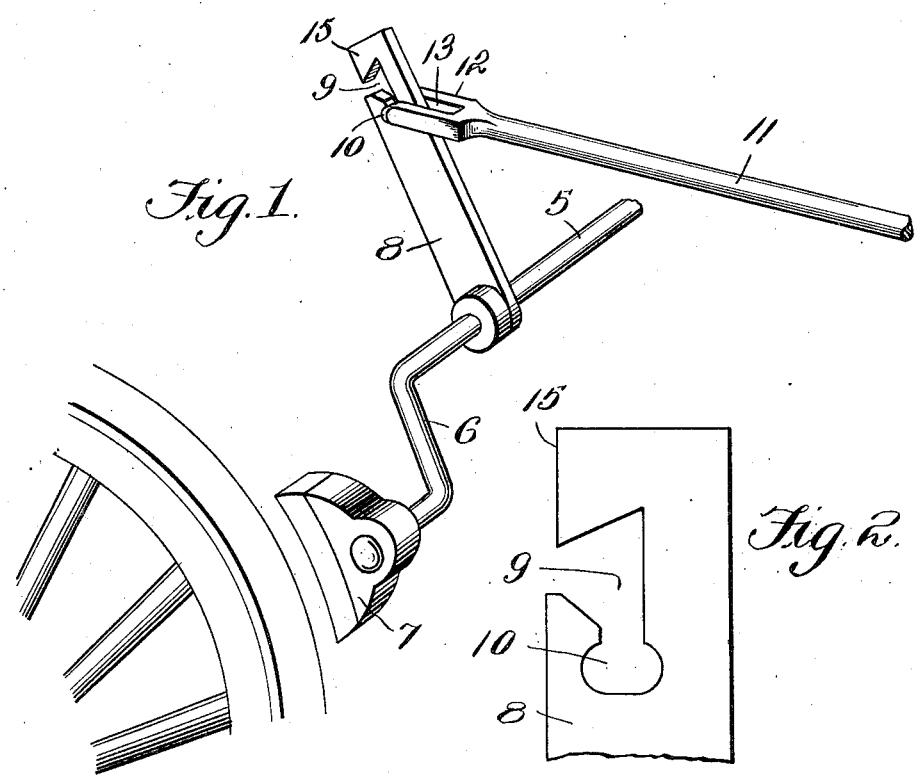
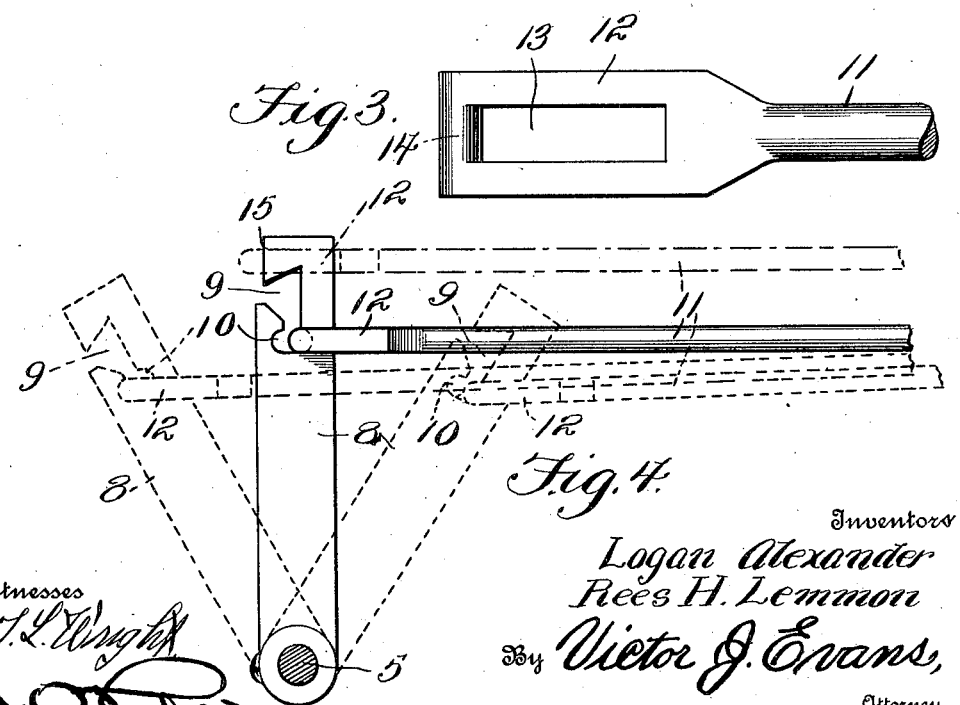
Inventors
Logan Alexander
Rees H. Lemmon
By Victor J. Evans,
Attorney
Witnesses

UNITED STATES PATENT OFFICE.

LOGAN ALEXANDER AND REES H. LEMMON, OF PERU, KANSAS.

WAGON-BRAKE.

998,825.

Specification of Letters Patent.   Patented July 25, 1911.

Application filed November 17, 1910. Serial No. 592,848.

*To all whom it may concern:*

Be it known that we, LOGAN ALEXANDER and REES H. LEMMON, citizens of the United States, residing at Peru, in the county of Chautauqua and State of Kansas, have invented new and useful Improvements in Wagon-Brakes, of which the following is a specification.

The invention relates to a wagon brake, and more particularly to the class of wagon brake connections.

The primary object of the invention is the provision of a wagon brake in which the throw or connecting rod may be readily and easily detached from the arm of a brake shaft when the said arm is in a perpendicular position, but when swung to either side of a perpendicular plane will prevent any possibility of the throw or connecting rod becoming detached.

Another object of the invention is the provision of a wagon brake in which the connection between the operating lever and the arm of the brake shaft may be separated when it is desired to remove the wagon body, and to dispense with the use of fastening devices, such as bolts and nuts usually employed for effecting a pivotal connection between the adjunct parts of the brake, thus obviating the possibility of the accidental release of any of the parts of the latter when in use.

A further object of the invention is the provision of a brake of this character in which the connecting rod will have a loose connection with the arm of the brake shaft, and will be prevented from accidentally becoming detached therefrom when the brake is being used, yet permitting the said rod to be readily and easily detached from the arm, should the occasion demand.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a perspective view of a brake constructed in accordance with the invention. Fig. 2 is a side elevation of the brake shaft arm with the brake rod detached. Fig. 3 is a fragmentary top plan view of the connecting or brake rod. Fig. 4 is a fragmentary side elevation of the brake rod shaft and connecting rod joined, and showing in dotted lines the various positions thereof when shifted.

Similar reference characters indicate corresponding parts throughout the several views of the drawings.

Referring to the drawings by numerals, 5 designates a portion of a brake shaft which may be of any desirable construction and has formed thereon at each end a crank 6, to which is pivotally connected the brake shoe 7, the brake shaft being formed with an upwardly extending arm 8, the latter being cut into near its upper edge to provide a dove-tailed shaped slot or recess 9 opening through the rear edge of the said arm. This slot 9 is provided with a downwardly extending oval-shaped socket 10 formed in the arm 8, the said socket intersecting or opening into the slot 9 for the reception of a throw or brake rod, as will be hereinafter more fully described.

The throw or brake rod comprises a connection in the form of a pitman or rod 11, the latter being formed at one end with a yoke 12 provided with an elongated eye 13, the outer end of the yoke being formed with a rounded or circular-shaped cross connecting web 14, which is adapted to engage in the socket 10 when passed through the entrance to the dove-tailed-shaped recess 9 in the arm 8 on the brake shaft. This arm 8 at its upper end is cut away at its rear edge to provide a reduced upper extremity 15 correspondingly shaped to the eye 13 formed in the yoke 12, thus assuring the positive engagement of the yoke in the recess 9 when the latter is passed downwardly onto the arm 8 of the brake shaft.

It will be evident that when the arm 8 of the brake shaft 5 is thrown to either side of a perpendicular plane when the yoke 12 is engaged in the socket 9 in the said arm, it will be impossible for the said yoke to become accidentally released from the said recess 9 in the said arm, but when the arm 8 is in perpendicular position, the yoke may be readily and easily detached therefrom by moving the yoke 12 upwardly out of the socket 10 into the recess 9, whence it may be passed rearwardly through the entrance to the said recess 9 and moved upwardly and from the reduced end 15 of the arm 8, thus releasing the connecting or brake rod 11 from its connection with the said arm of the brake shaft.

What is claimed is:

1. The combination with a brake shaft having an arm provided with a dove-tailed shaped recess opening through its rear edge, and a socket intersecting the recess, of a connecting rod having an eye terminal detachably engaged in the socket in the said arm.

2. The combination with an arm of a brake shaft, having a slot therein opening through its rear edge, and a seat intersecting the said slot, of a connecting rod having a yoke provided with a rounded cross connecting web loosely engaged in the seat and detachable therefrom through the said slot in the arm.

3. In a connection of the class described, a brake shaft arm having a slot provided with rearwardly converging walls and opening through the rear edge of said arm, and a brake rod having a yoke engaging in the said slot, the said arm being further provided with a seat intersecting the slot for receiving the yoke.

In testimony whereof we affix our signatures in presence of two witnesses.

LOGAN ALEXANDER.
REES H. LEMMON.

Witnesses:
J. A. House,
J. O. Green.

Copies of this patent may be obtained for five cents each, by addressing the "Commissioner of Patents, Washington, D. C."